US008837731B2

(12) United States Patent
Kudelski et al.

(10) Patent No.: US 8,837,731 B2
(45) Date of Patent: Sep. 16, 2014

(54) SECURE REMOTE CONTROL FOR AUDIO/VIDEO RECEIVER/DECODER

(75) Inventors: André Kudelski, Lutry (CH); Christophe Nicolas, St-Prex (CH)

(73) Assignee: Nagravision S.A., Cheseaux-Sur-Lausanne (CH)

( * ) Notice: Subject to any disclaimer, the term of this patent is extended or adjusted under 35 U.S.C. 154(b) by 169 days.

(21) Appl. No.: 13/137,158

(22) Filed: Jul. 25, 2011

(65) Prior Publication Data

US 2012/0051545 A1   Mar. 1, 2012

Related U.S. Application Data

(60) Provisional application No. 61/367,470, filed on Jul. 26, 2010.

(30) Foreign Application Priority Data

Nov. 30, 2010   (EP) .................................... 10193145

(51) Int. Cl.
| | |
|---|---|
| *H04K 1/00* | (2006.01) |
| *H04N 7/167* | (2011.01) |
| *H04W 12/06* | (2009.01) |
| *G06F 21/10* | (2013.01) |
| *G08C 17/02* | (2006.01) |
| *H04N 5/44* | (2011.01) |
| *H04N 21/266* | (2011.01) |
| *H04N 21/422* | (2011.01) |
| *H04N 21/4623* | (2011.01) |

(52) U.S. Cl.
CPC ............... *H04N 7/167* (2013.01); *H04W 12/06* (2013.01); *G06F 21/10* (2013.01); *G08C 17/02* (2013.01); *G08C 2201/20* (2013.01); *G08C 2201/61* (2013.01); *H04N 5/4403* (2013.01); *H04N 21/26613* (2013.01); *H04N 21/42204* (2013.01); *H04N 21/4623* (2013.01)
USPC ........................................................ 380/270

(58) Field of Classification Search
CPC .............................. H04W 12/04; H04W 12/06
See application file for complete search history.

(56) References Cited

U.S. PATENT DOCUMENTS

| | | | |
|---|---|---|---|
| 6,804,357 | B1 | 10/2004 | Ikonen et al. |
| 8,156,545 | B2 * | 4/2012 | Shintani et al. .................. 726/4 |
| 8,284,094 | B2 * | 10/2012 | Hamai et al. .................. 341/176 |
| 8,307,146 | B2 * | 11/2012 | Lydon et al. .................. 710/315 |
| 2004/0264700 | A1 * | 12/2004 | Kirkland ........................ 380/270 |
| 2005/0013437 | A1 | 1/2005 | Ikonen et al. |
| 2006/0153386 | A1 * | 7/2006 | Ksontini et al. .............. 380/277 |
| 2007/0244819 | A1 * | 10/2007 | Goeke et al. .................... 705/52 |
| 2007/0253551 | A1 * | 11/2007 | Guillot et al. ................. 380/200 |
| 2007/0258395 | A1 * | 11/2007 | Jollota et al. .................. 370/310 |
| 2008/0169907 | A1 | 7/2008 | Ootsuka |
| 2008/0320190 | A1 * | 12/2008 | Lydon et al. .................. 710/106 |
| 2009/0195407 | A1 | 8/2009 | Nakano et al. |
| 2009/0228910 | A1 | 9/2009 | Christinat et al. |
| 2009/0232308 | A1 * | 9/2009 | Candelore et al. ............ 380/270 |
| 2010/0009629 | A1 * | 1/2010 | Jung et al. .................... 455/41.2 |
| 2010/0017858 | A1 * | 1/2010 | DaCosta .......................... 726/4 |
| 2010/0023764 | A1 * | 1/2010 | DaCosta ........................ 713/168 |
| 2010/0024003 | A1 * | 1/2010 | Malledant et al. ................ 726/3 |
| 2010/0211685 | A1 * | 8/2010 | McDowall et al. ........... 709/227 |
| 2010/0315279 | A1 * | 12/2010 | Hamai et al. .................. 341/176 |
| 2011/0078445 | A1 * | 3/2011 | Xiao et al. .................... 713/171 |
| 2011/0273625 | A1 * | 11/2011 | McMahon et al. ............ 348/734 |
| 2011/0299683 | A1 * | 12/2011 | Candelore ..................... 380/255 |
| 2011/0302088 | A1 * | 12/2011 | Al-Herz et al. ................. 705/67 |
| 2011/0314168 | A1 * | 12/2011 | Bathiche et al. ............. 709/228 |

FOREIGN PATENT DOCUMENTS

| | | |
|---|---|---|
| CN | 101507276 A | 8/2009 |
| EP | 1150506 A2 | 10/2001 |
| EP | 1947621 A2 | 7/2008 |
| EP | 2098971 A1 | 9/2009 |
| WO | WO-2009109583 A1 | 9/2009 |
| WO | WO-2010134424 A1 | 11/2010 |

OTHER PUBLICATIONS

Su et al. ("Research of New Wireless Sensor Network Protocol: ZigBee RF4CE", 2010 International Conference on Electrical and Control Engineering (ICECE), IEEE, Piscataway, NJ, USA, Jun. 25, 2010, pp. 2921-2924, XP031796468, ISBN: 978-1-4244-6880-5.*
Su et al., "Research of New Wireless Sensor Network Protocol: ZigBee RF4CE", 2010 International Conference on Electrical and Control Engineering (ICECE), IEEE, Piscataway, NJ, USA, Jun. 25, 2010, pp. 2921-2924, XP031796468, ISBN: 978-1-4244-6880-5.*
Kyusuk Han et al., "Design of Secure Key Agreement Protocol for Pairing in RF4CE", Internet Technology and Secured Transactions (ICITST), 2010 International Conference for IEEE, Piscataway, NJ, Nov. 8, 2010 (pp. 1-5; paragraphs 2.2, 2.3 and 5).
European Search Report, dated Apr. 28, 2011.
International Search Report and Written Opinion dated Sep. 6, 2011 issued in corresponding International Application No. PCT/EP2011/062684.
Dong-feng Su et al., "Research of New Wireless Sensor Network Protocol: ZigBee RF4CE," *2010 Int'l Conf. on Elect. And Control Eng.*, IEEE, Piscataway, NJ, pp. 2921-2924 (Jun. 25, 2010) XP031796468.
Taeshik Shon et al., "A Secure and Robust Connectivity Architecture for Smart Devices and Applications," *Eurasip J. on Wireless Comm. And Networking*, vol. 2011, pp. 1-12 (Jan. 1, 2010) XP55005728.
Taeshik Shon et al., "Implementation of RF4CE-based Wireless Auto Configuration Architecture for Ubiquitous Smart Home," *2010 Int'l Conf. on Complex, Intelligent and Software Intensive Systems*, IEEE, Piscataway, NJ, pp. 779-783 (Feb. 15, 2010) XP031657759.
Bonhyun Koo et al., "R-URC: RF4CE-based Universal Remote Control Framework Using Smartphone," *2010 Int'l Conf. on Computational Sci. And Its Applications*, IEEE, Piscataway, NJ, pp. 311-314 (Mar. 23, 2010) XP031683842.

* cited by examiner

*Primary Examiner* — Jeffrey Pwu
*Assistant Examiner* — Carlos Amorin
(74) *Attorney, Agent, or Firm* — Harness, Dickey & Pierce, P.L.C.

(57) ABSTRACT

A system includes a remote control device and a security device, wherein both devices share a unique and constant common key, algorithms or protocol specific to a pair formed by the remote control device and the security device. The unique and constant common key, algorithms or protocol are set up during a device initialization phase. The remote control device is configured to communicate wirelessly with a receiver of the security device. The remote control device, which is paired with the security device sending data towards the receiver, includes an encryption module and a memory to store the unique and constant common key. The data is encrypted by the encryption module with the unique and constant common key, and the security device includes a decryption module and a key corresponding to the unique and constant common key to decrypt the data received from the remote control device.

12 Claims, 3 Drawing Sheets

SECURE REMOTE CONTROL FOR AUDIO/VIDEO RECEIVER/DECODER

CROSS REFERENCE TO RELATED APPLICATIONS

This application claims priority under 35 U.S.C. §119 and 119(e) to European Patent Application No. 10193145.9, filed on Nov. 30, 2010, in the European Intellectual Property Office, and also claims priority to U.S. Provisional Application No. 61/367,470, filed on Jul. 26, 2010, in the U.S. Patent and Trademark Office, the entire contents of each of which are herein incorporated by reference.

INTRODUCTION

The present invention is related to the field of receiver/decoder for television reception and in particular focused on the remote control of said receiver/decoder.

TECHNICAL BACKGROUND

A receiver/decoder also called IRD (Integrated Receiver Device) or set top box is a home appliance connected to an input signal for receiving television channels. The input signal can be of different types and provided by various sources such as satellite, terrestrial reception antenna, cable or IP connections.

The input signal is then processed by the IRD to tune or filter a channel requested by the user. The IRD is generally connected to a television set that allows a user watching displayed content of a selected television channel.

The IRD may also comprise recording capabilities generally on a hard disc and performs various tasks related to conditional access to the content. For that purpose, the IRD can be connected to a security module in charge of processing access rights messages, checking the access conditions and releasing keys authorizing access to the content.

The IRD can be in form of a module directly plugged into a connection slot of the television set, the input signal being first received and filtered (or tuned) by the television set and passed to the module which processes the access conditions and the decryption of the security layer.

The IRD is driven by a remote control allowing transmitting numerous user commands such as: selecting a channel, entering a password in case of parental control for example, activating an electronic program guide (EPG), managing user parameters and profiles, scheduling content recording, selecting various operations modes, etc.

The communication protocol between the IRD and the remote control being known, some manufacturers propose compatible remote controls having enhanced features such as driving a plurality of devices.

An IRD is not only used in a one way consumption device, but is also used in an interactive device to enter commands for ordering goods, to participate to a survey or simply to confirm the presence of the user. In this particular case, the document WO2009/109583 proposes a mechanism to reward a user for watching advertisements. This document describes the display of a pseudo-random character to ascertain that a real user is setting next to the television set rather than a modified remote control connected to a web site that automatically transmits the right answer to all connected remote controls without requiring the presence any user.

BRIEF DESCRIPTION OF THE INVENTION

A main goal of the present invention is to provide a protection of the communication between the remote control and the IRD so that only a given remote control can transmit commands to a given IRD.

This goal is achieved by a system comprising a remote control device and a security device, both sharing a common key, algorithms or protocol specific to a pair formed by the remote control device and the security device, the remote control device comprising means to send wirelessly data to a receiver comprising the security device, the remote control device being paired with the security device is characterized in that data sent by the remote control device towards the receiver is specific to the pair formed by the remote control device and the security device, said remote control device comprising encryption means and a memory to store a specific key, said data being encrypted by the encryption means with the specific key, the security device comprising decryption means and a key corresponding to the specific key to decrypt the received data.

A further object of the invention is a portable computer unit comprising an application configured for sharing a common key, algorithms or protocol specific to a pair formed by the tablet computer and a security device distant from the portable computer unit having means to send wirelessly data to the security device, characterized in that data sent by the portable computer unit towards the security device is specific to the pair formed by the portable computer unit and the security device, the portable computer unit comprising encryption means and a memory to store a specific key, said data being encrypted by the encryption means with the specific key before sending to the security device.

The protection may be granted by one of the following methods:

Using a pairing protocol to pair the remote control device with the security device in a way that the security can only receive command from an authorized remote control device that has been paired with the security device. The pairing may be one to one or a class pairing i.e. a pairing of one remote control device with a group of security devices belonging to a same user and/or located in a same accommodation. This pairing is not equivalent to the standard pairing that is designed to avoid interferences between different remote control devices (e.g. blue tooth protocol). This means that only authorized equipment, with an authorized algorithm and/or key may be paired.

A process of enrolling the remote control device is performed during an initialization phase in which pairing data including an appropriate key and algorithm are defined in the remote control device as well as in the security device. This initialization may be done at the manufacturing process of both devices or through sending the appropriate key and algorithm from the security device to the remote control device.

The pairing protocol may be a combination of a learning process from a "master" remote control device and a key and/or a specific algorithm that is specific to the class of security devices (or specific to a given security device). The enrolling process of the slave remote control device follows the same approach as enrolling the master remote control device with the security device.

Using a bidirectional data exchange between the security device and the remote control device by transmitting data in clear or encrypted and/or signed form by using cryptography or equivalent. This dynamic data exchange may be performed at starting or booting of the security device, and optionally on a regular basis between the security device and the remote control device.

Using a one way (or bidirectional) data transmission between the remote control device and the security device with synchronization (e.g. time) and encrypted and/or signed commands which are not predictable for an external observer.

Using a one way (or bidirectional) data transmission between the remote control device and the security device that is variable. A repetition of a previously sent command will not result in the expected action.

According to the present invention, the device containing pairing data such as a key, algorithms or protocol is called the security device and can be the IRD device itself or a security module associated to the IRD, depending on the various embodiments.

The remote control device may be made up of a dedicated portable unit provided with user command means such as a keypad configured for activating an infrared transmitter/receiver exchanging encrypted data between the remote control device and the security device.

According to an embodiment, the remote control device is made up of a portable computer unit having means for communicating with external networks and provided with at least one user command application configured for activating a radio frequency transmitter/receiver exchanging encrypted data between the portable computer unit and the security device.

The portable computer unit may consist either of a portable computer, a portable tablet computer or a smart phone.

The radio frequency transmitter/receiver may be of type Bluetooth, WiFi, or any other type of wireless transceiver using airwaves.

BRIEF DESCRIPTION OF THE FIGURES

The invention will be better understood with the following detailed description, which refers to the attached figures given as non-limitative examples.

DETAILED DESCRIPTION OF THE INVENTION

Figure 1:
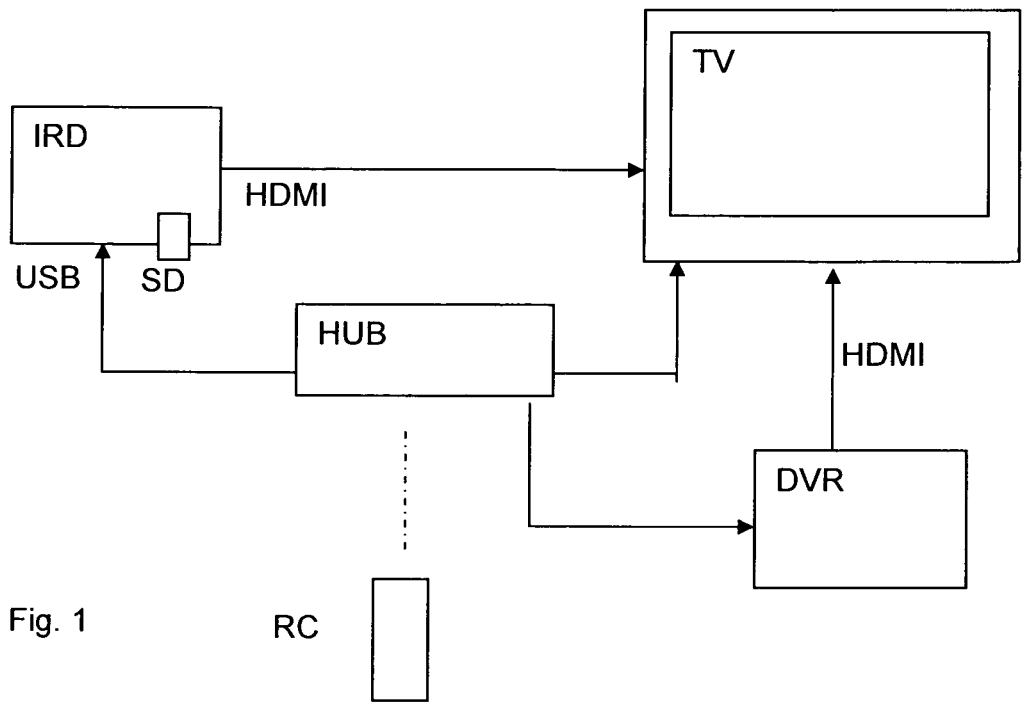
FIG. 1 shows a remote control device driving a remote hub to which is connected either one or a plurality of other devices.

The FIG. 1 shows a particular way of using a universal remote control device RC. A remote hub HUB receives commands from the universal remote device RC thanks to an IR of RF receiver. It further comprises an IR emitter (or RF emitter) that passes the commands to the security device IRD or to another device such as a television set TV. The role of the remote hub HUB is to filter and direct commands sent by the remote control device RC to the appropriate device. With a pairing of the remote control device RC with the security device IRD, this system will no longer work since the remote hub HUB will not know the necessary keys, algorithm or protocol used to communicate with the security device IRD.

Figure 2:
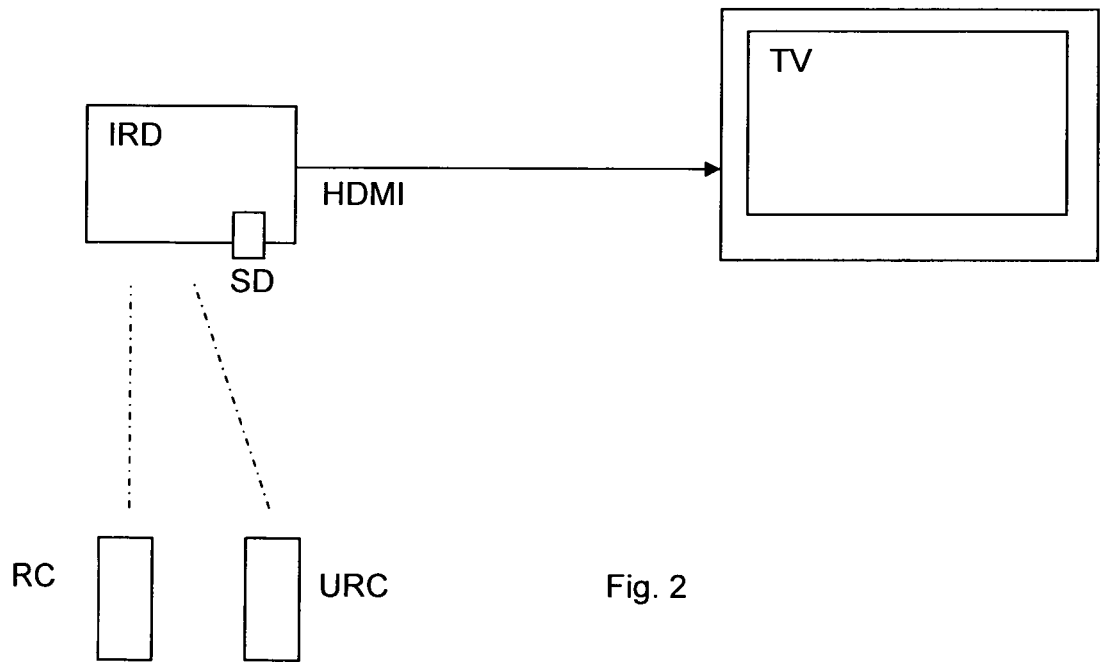
FIG. 2 shows a universal and a proprietary remote control device driving a security device.

In a similar way a system according to FIG. 2 will ban the use of a universal remote control device URC in particular when it is connected to Internet to receive commands from a management center. This could be particularly useful when surveys are carried out using a rewarding policy for watching advertisements. With a personalized or paired remote control device RC, only a true person can pass the commands and answer to the questions displayed on the screen.

As stated above, the genuine remote control device RC contains a key or a plurality of keys to encrypt the communication with the IRD. A key or a plurality of keys equivalent to the one of the remote control device is stored in the IRD to decrypt the commands. The pairing between these two devices is achieved when the key (or keys) used to encrypt or decrypt this communication is specific to the set remote control device IRD. Instead of encryption, the protocol between the IRD and the remote control device can be specific to this pair of device. The meaning of a data received by the IRD is obtained thanks to a look-up table where received data is the input of the table and the data pointed by the input form output data of the table as well as the correct command.

Figure 3:
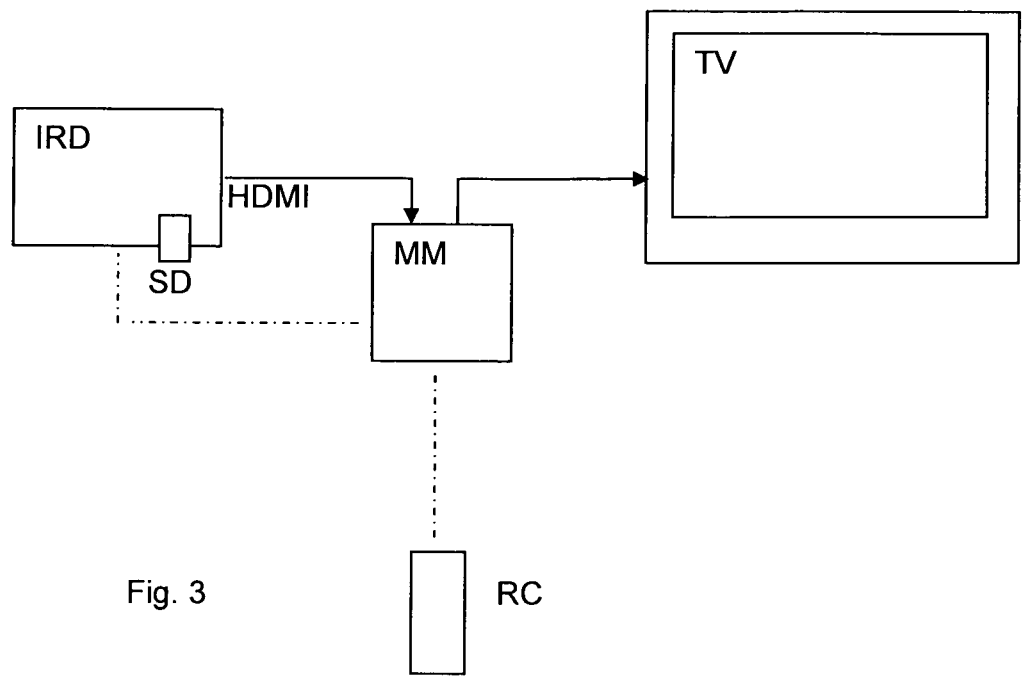
FIG. 3 shows a remote control device in connection with an intermediate device connected between a security device and a television set.
Figure 4:
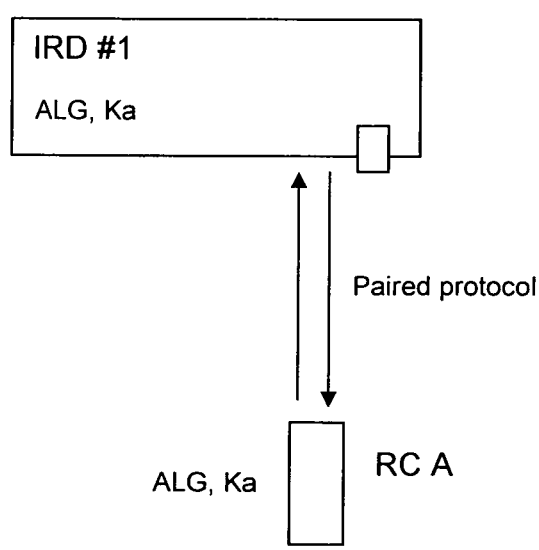
FIG. 4 illustrates an encryption layer used in the communication protocol

The FIG. 3 shows a case where an overlay is added by an intermediate device MM on top of the image produced by the IRD on the display of the television set TV. This overly can add information and/or advertisement related to the current displayed program. This intermediate device MM can be connected to Internet and substitute the advertisements coming from the IRD by advertisements generated by the supplier of the intermediate device MM. In a same way, the paired remote control device will forbid the use of a standard universal remote control device in this case.

The security device is preferably made up of a security module removably, connected to the receiver and configured for storing at least keys Ka, algorithms ALG and protocol information required for pairing said security module with the remote control device. The receiver comprises thus means to forward data received from the remote control device to the security module and means to retrieve from the security module said received data in clear form to be processed by the receiver. The remote control device and the security module are then also paired, i.e. the same key Ka, algorithms ALG or protocol are stored in the security module and the remote control device RC.

The IRD receives the commands from the remote control device RC and passes them to the security module. In return, the security module converts these proprietary commands to a generic command common to all IRD and executable by the IRD.

The remote control device can have an IR (infra red) transmitter, a radio frequency transmitter or both. The pairing can be activated with two or more IRD. According to a first embodiment, all IRD share the same secret. The commands sent by the remote control device are therefore comprehensible to all receivers. In another embodiment, the remote control device comprises a selector allowing selecting a target device and loading the appropriate data from a memory storing several target device data. Each target device can thus be recorded with its own security layer (keys or protocol) which may be sequentially loaded into the target device. An initialization is carried out for each device in the same way as for a single device as described above.

Figure 5:
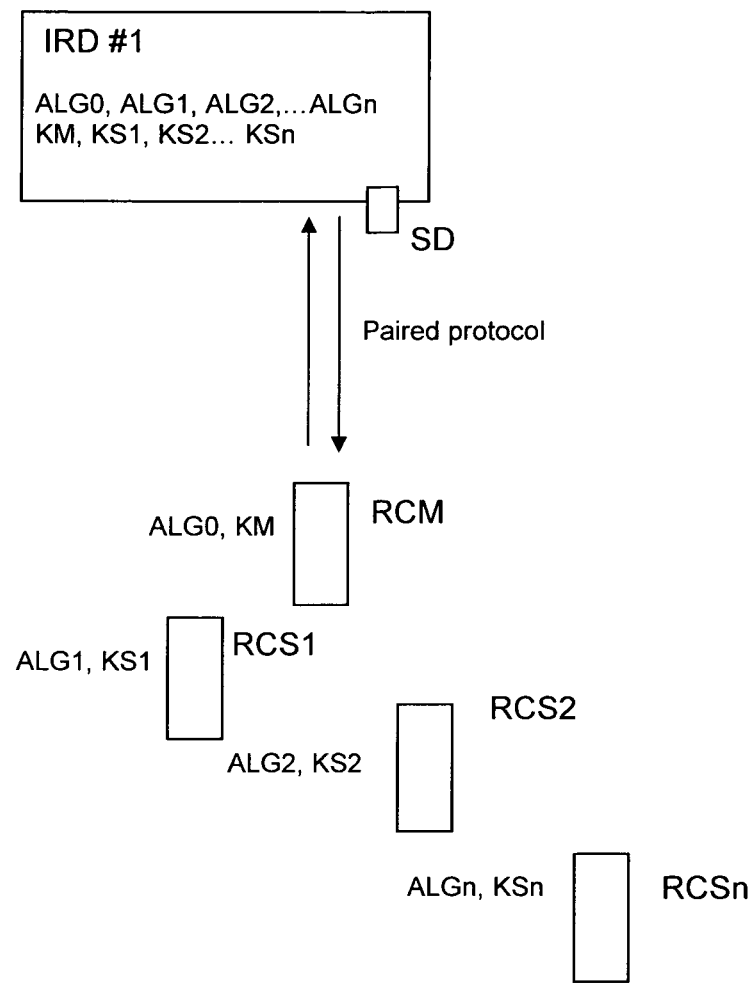
FIG. 5 illustrates a case where multiple remote control devices communicate by using an encryption layer.

As illustrated in the FIG. 5, the security device can be paired with more than one remote control device. In this case, the security module stores in its memory the specific keys KM, KS1, KS2, . . . KSn, algorithms ALG0, ALG1, ALG2, ..., ALGn or protocol for each remote control device. A master remote control device RCM and a plurality of slave remote control devices KS1, KS2, ... KSn may be recorded in the security module and paired, the keys of the slaves KS1, KS2, ... KSn are generated on the basis of the master key KM.

In a preferred embodiment, the message sent by each remote control device containing the command data, comprises a header with an identifier to indicate which remote control device is currently sending this message. The security device can then load the correct key KM, KS1, KS2, ... KSn, algorithm ALG0, ALG1, ALG2, ..., ALGn or protocol in order to retrieve the related user's command.

In the present invention, the remote control device comprises a memory to store the various parameters (key, algorithms or protocol) pertaining to the proprietary communication with the receiver IRD. In the case of a specific key, the remote control device comprises encryption means and a memory to store the specific key. In the case of a specific protocol or algorithm, the remote control device comprises a message builder which is parameterized according to the specific protocol or algorithm. This message builder receives user command data from the keypad and encapsulates the user command data into a message configured according to a specific protocol or algorithm. The security device IRD, at reception of the message processes it by using a message interpreter which is parameterized by the specific protocol or algorithm so that the command data sent by the user is retrieved.

During an initialization phase the remote control device can generate the specific key (or the parameter of the specific protocol or algorithm) and send it to the security device. This key can be either symmetric or asymmetric. In case of an asymmetric key, the remote control device preferably keeps the private key and the public key is sent to the security device. After this initialization step, the remote control device and the security device are paired.

In an embodiment, the specific key may be generated, during the initialization phase, on the basis of at least an identifier of the remote control device or an identifier of the security device or both the identifier of the remote control device and the identifier of the security device.

According to a further embodiment, the remote control device is pre-initialized by the specific key, protocol or algorithm. This remote control device further comprises an identifier. The user then sends the identifier of its remote control device to a management center together with an identifier of the IRD receiver, security device (or security module). The management center prepares a message such as an EMM (Entitlement Management Message) containing the specific key, protocol or algorithm toward the IRD receiver which reads this message and loads the key, protocol or algorithm data into the security device. The remote control device and the security device (receiver, security module) are thus paired.

According to a further embodiment related to a remote control device made up of a portable computer unit such as a portable computer, a portable tablet computer or a smart phone, the pairing data including at least a key, an algorithm and protocol may be directly downloaded from a managing center upon user request. As the portable computer unit is provided with an Internet connection via wireless mobile network (WiFi, 3G, GPRS, EDGE, etc.), the user may register the security device IRD which has to be paired by using the previously installed remote control application in the portable computer unit. In response to the registration or request, the managing center sends the necessary pairing data to the portable computer unit which retransmits them to the security device IRD. The pairing process is then completed when the remote control application communicates with the IRD for storing and sharing the pairing data with both devices.

According to a further embodiment related in particular to a remote control device made up of a portable unit dedicated for remote control only without any communication means to external networks, the pairing data are provided by the IRD having communication means to the managing center. A download request may be sent with the remote control device to the security device IRD which forwards the request to the managing center. An appropriate user interface on the screen of the television set connected to the IRD guides the user by allowing entering parameters for the request and IRD registration as well as displaying messages related to the pairing data downloading. The pairing data sent by the managing center will then follow the same path in reverse order. This procedure may also be applied optionally by a remote control device in form of a portable computer, a portable tablet computer or a smart phone.

The downloading procedures are performed not only at first use or initialization phase of the remote control device and the IRD but also at any update or renewal of the pairing data for example when IRD software changes.

The invention claimed is:
1. A system, comprising:
a remote control device; and
a security device, the remote control device and the security device being configured to share at least one attribute that is specific to a pair formed by the remote control device and the security device, the at least one attribute being one of a key and an algorithm/protocol, the pair being formed during an initialization phase of the remote control and security devices, the initialization phase occurring during manufacturing of the system, wherein
the remote control device is configured to communicate wirelessly with a receiver associated with the security device,
the remote control device includes a transmitter configured to transmit a pairing data download request to the security device, the pairing data download request being a request for data associated with the pair formed by the remote control device and the security device,
the security device is configured to forward the pairing data download request to a managing center and receive pairing data associated with the pairing data download request from the managing center, the pairing data including the at least one attribute,
the remote control device is configured to receive the pairing data from the security device,
the remote control device sends data to the receiver,
the remote control device includes a first memory configured to store the key, and an encryption device configured to encrypt the data with the key stored in the first memory, and
the security device includes a decryption device, and a second memory configured to store the key, the decryption device being configured to decrypt the data received from the remote control device with the key stored in the second memory.
2. The system according to claim 1, wherein the remote control device includes a dedicated portable unit provided with a user command interface configured to activate an infrared transmitter/receiver to exchange encrypted data between the remote control device and the security device.

3. The system according to claim 1, wherein the remote control device includes a portable computer unit provided with at least one user command application configured to activate a radio frequency transmitter/receiver to exchange encrypted data between the portable computer unit and the security device.

4. The system according to claim 3, wherein the portable computer unit is one of a portable computer, a portable tablet computer and a smart phone.

5. The system according to claim 4, wherein a user command application of the portable computer unit is configured to download pairing data from a managing center upon user request, the pairing data including the at least one attribute, and the pairing data being retransmitted to the security device by the remote control device.

6. The system according to claim 1, wherein the at least one attribute is generated, during the initialization phase, on a basis of at least one of an identifier of the remote control device and an identifier of the security device.

7. The system according to claim 1, wherein,
the remote control device further includes,
a message builder parameterized according to the algorithm/protocol, said message builder encapsulating user command data into a message configured according to the algorithm/protocol, and
the security device includes a message interpreter which is parameterized by the algorithm/protocol so that the user command data is retrieved.

8. The system according to claim 1, wherein the security device is integrated in the receiver.

9. The system according to claim 1, wherein the security device includes a security module removably connected to the receiver, the security module being configured to store the at least one attribute used for pairing said security module with the remote control device, said receiver being configured to forward data received from the remote control device to the security module and to retrieve, from the security module, said received data in clear form to be processed by the receiver.

10. A portable computer unit, comprising:
a first device configured to share, with a security device that is separate from the portable computer unit, at least one attribute that is specific to a pair formed by the portable computer unit and the security device, the at least one attribute being one of a key and an algorithm/protocol, the pair being formed during an initialization phase of the portable computer unit, the initialization phase occurring during manufacturing of the portable computer unit;
a transmitter configured to transmit a pairing data download request to a managing center via the security device, the pairing data download request being a request for data associated with the pair formed by the remote control device and the security device;
a receiver configured to receive pairing data associated with the pairing data download request and transmitted by the managing center via the security device, the pairing data including the least one attribute;
a memory configured to store the key; and
a second device configured to encrypt data with the stored key, wherein the first device is configured to wirelessly send the encrypted data to the security device.

11. The portable computer unit according to claim 10, wherein the portable computer unit is one of a portable computer, a portable tablet computer and a smart phone.

12. A system, comprising:
a remote control device configured to store a key during an initialization phase of the remote control device, the initialization phase occurring during manufacturing of the system; and
a security device configured to store the key during the initialization phase, the key being specific to a pair formed by the remote control device and the security device, wherein,
the remote control device is configured to communicate wirelessly with a receiver associated with the security device,
the remote control device is configured to send data to the receiver,
the remote control device includes an encryption device configured to encrypt the data with the key stored in the remote control device, and
the security device includes a decryption device configured to decrypt the data received from the remote control device with the key stored in the security device.

* * * * *